United States Patent [19]

Han

[11] Patent Number: 6,125,142
[45] Date of Patent: Sep. 26, 2000

[54] METHOD AND APPARATUS FOR ENCODING OBJECT INFORMATION OF A VIDEO OBJECT PLANE

[75] Inventor: Seok-Won Han, Seoul, Rep. of Korea

[73] Assignee: Daewoo Electronics Co., Ltd., Seoul, Rep. of Korea

[21] Appl. No.: 08/984,030

[22] Filed: Dec. 2, 1997

[51] Int. Cl.[7] ............... H04N 47/12; H04N 11/02; H04N 11/04
[52] U.S. Cl. ............... 375/240.1; 375/240.13; 348/415
[58] Field of Search ............... 375/240.1, 240.13, 375/245; 348/404, 415, 416; 382/236, 239; H04N 7/12, 11/02, 11/04

[56] References Cited

U.S. PATENT DOCUMENTS

| | | | |
|---|---|---|---|
| 5,596,370 | 1/1997 | Jung | 348/416 |
| 5,974,184 | 10/1999 | Eifrig et al. | 382/236 |
| 5,978,510 | 11/1999 | Chung et al. | 348/416 |
| 6,043,846 | 3/2000 | Shen et al. | 348/413 |
| 6,055,330 | 4/2000 | Eleftheriadis et al. | 382/236 |

FOREIGN PATENT DOCUMENTS 06350856  12/1994  Japan .

OTHER PUBLICATIONS

Ogihara eta l., "Data Embedding into Pictorial Images with Less Distortion Using Discrete Cosine Transform" IEEE Comput. Soc. Press, Autust 1998, vol. 2, pp. 675–679.

Ostermann et al., "Coding of Arbitrarily Shaped Video Objects in MPEG–4" IEEE, Jul. 1997, pp. 496–499.

Primary Examiner—Howard Britton
Assistant Examiner—Nhon T Diep
Attorney, Agent, or Firm—Anderson Kill & Olick, PC

[57] ABSTRACT

A method for encoding a video signal including a video object plane(VOP) and object information thereof, the VOP having an object therein, divides the VOP into a plurality of blocks and detecting boundary blocks and object blocks, wherein each boundary block includes therein background pixels and object pixels and each object block includes therein object pixels only, the background and the object pixels representing pixels residing outside and inside the object, respectively. Then the object information is converted into a set of object symbols and each object symbol is added to a background pixel included in a boundary block to thereby produce processing blocks, the processing blocks including the object blocks and one or more processed boundary blocks having therein the object symbols and the remaining unprocessed boundary blocks. The processing blocks are encoded to thereby generate an encoded video signal.

20 Claims, 4 Drawing Sheets

METHOD AND APPARATUS FOR ENCODING OBJECT INFORMATION OF A VIDEO OBJECT PLANE

FIELD OF THE INVENTION

The present invention relates to a method and apparatus for encoding object information of a video object plane; and, more particularly, to a method and apparatus for encoding the object information of the video object plane with an improved coding efficiency.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of the digital data therethrough, it is inevitable to compress or reduce the volume of data through the use of various data compression techniques, especially, in the case of such low bit-rate video signal encoders as video-telephone and teleconference systems.

One of such techniques for encoding video signals for a low bit-rate encoding system is the so-called object-oriented analysis-synthesis coding technique (see, e.g., *MPEG-4 Video Verification Model Version* 7.0, International Organization for Standardization, Coding of Moving Pictures and Associated Audio Information, ISO/IEC JTC1/SC29/WG11 MPEG97/N1642, Bristol, April 1997). According to the object-oriented analysis-synthesis coding technique, an input video image is divided into objects, i.e., video object planes(VOP's), wherein the VOP's correspond to entities in a bitstream that a user can have an access to and manipulate; and three sets of parameters for defining motion, shape and texture information of each object are processed through different encoding channels.

A VOP can be referred to as an object and represented by a bounding rectangle whose width and height may be the smallest multiple of 16 pixels (a macroblock size) surrounding each object so that the encoder may process the input video image on a VOP-by-VOP basis, i.e., an object-by-object basis. A VOP includes texture information of the VOP representing luminance and chrominance data of the VOP and shape information representing a shape and a location of the object.

In the texture information, a pixel is represented by one of a value ranging from, e.g., 1 to 255; and in the shape information, a binary value, e.g., 0 is used to designate a pixel, i.e., a background pixel, located outside the object in the VOP and another binary value, e.g., 255, is used to indicate a pixel, i.e., an object pixel, inside the object.

Referring to FIG. 1, there is illustrated a conventional encoding apparatus 100 for encoding texture information of a VOP. At a converter 105, an object pixel value of shape information of the VOP is changed from 255 to 1 to thereby provide converted shape information to a multiplier 110 and a block selection unit 125, wherein the converted shape information contains therein object pixels having 1 and background pixels of the value zero. At the multiplier 110, texture information of the VOP is multiplied by the converted shape information, thereby generating converted texture information to a padding block 120. In the converted texture information, the object pixels retain their original values whereas the pixels outside the object have zero values. The padding block 120 performs a padding process for the background pixels in the converted texture information through the use of a conventional repetitive padding technique in order to improve data compression efficiency, wherein in the repetitive padding technique the background pixels are padded by new values obtained based on boundary pixel values of the object.

Referring to FIG. 2, there is illustrated an exemplary VOP 10 represented by padded texture information, wherein the VOP 10 includes an object 15 represented by a hatched portion and a background represented by an unhatched portion. The block selection unit 125, responsive to the converted shape information and the padded texture information, detects the object 15 and the background 20 in the VOP 10; and divides the VOP 10 into a plurality of DCT(discrete cosine transform) blocks of, e.g., 8×8 pixels, e.g., 1 to 12. Thereafter, the block selection unit 125 selects DCT blocks overlapping with the object 15 and provide them to a DCT block 130 as processing blocks. In the example shown in FIG. 2, the DCT block 1 is not overlapping with the object 15; and, therefore, the DCT block 2–12 are selected as the processing blocks. At the DCT block 130, each of the processing blocks is converted to a set of DCT coefficients and the set of DCT coefficients is then provided to a quantization block 140. At the quantization block 140, the set of DCT coefficients is quantized and transmitted to a transmitter(not shown) for the transmission thereof.

Object information, on the other hand, e.g., representing an index, a title, a producer, user-editability and the like of an object may need to be encoded apart from the motion, shape and texture information of the object and transmitted as a header of encoded sequence of the object. In this connection, if there are a lot of objects to be transmitted, the amount of the object information becomes large to thereby result in a degraded coding efficiency.

SUMMARY OF THE INVENTION

It is, therefore, a primary object of the invention to provide a method and apparatus for efficiently encoding object information of a video object plane(VOP).

In accordance with one aspect of the present invention, there is provided a method for encoding a video signal including a video object plane(VOP) and object information thereof, the VOP having an object therein, comprising the steps of: (a) dividing the VOP into a plurality of blocks and detecting boundary blocks and object blocks, wherein each boundary blocks includes therein background pixels and object pixels and each object block includes therein object pixels only, the background and the object pixels representing pixels residing outside and inside the object, respectively; (b) converting the object information into a set of object symbols; (c) adding each object symbol to a background pixel included in a boundary block to thereby produce processing blocks, the processing blocks including the object blocks and one or more processed boundary blocks having therein the object symbols and the remaining unprocessed boundary blocks; and (d) encoding the processing blocks to thereby generate an encoded video signal.

In accordance with another aspect of the present invention, there is provided an apparatus for encoding a video signal including a video image, which has an object therein, an object information, wherein the video image is composed of object pixels and background pixels, the object pixels residing inside the object and the background pixels residing outside the object, comprising: means for dividing the video image into a plurality of blocks and classifying each blocks as one of a background block, a boundary block and an object block, wherein the background block includes therein background pixels only, the boundary block includes therein object and background pixels and the object block includes therein object pixels only; means for generating a set of object symbols of binary numbers representing the object information; means for producing processing blocks by incorporating the object symbols into the object blocks and the boundary blocks; and means for encoding the processing blocks thereby generating an encoded video signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 2:
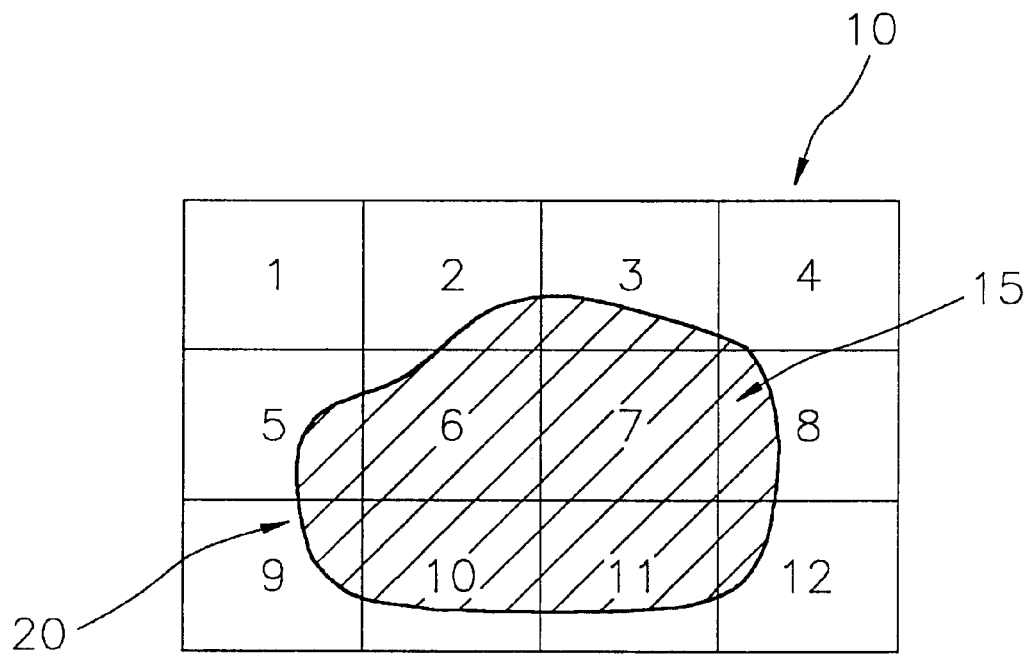
FIG. 2 shows an extended VOP which is divided into a plurality of DCT blocks.
Figure 3:
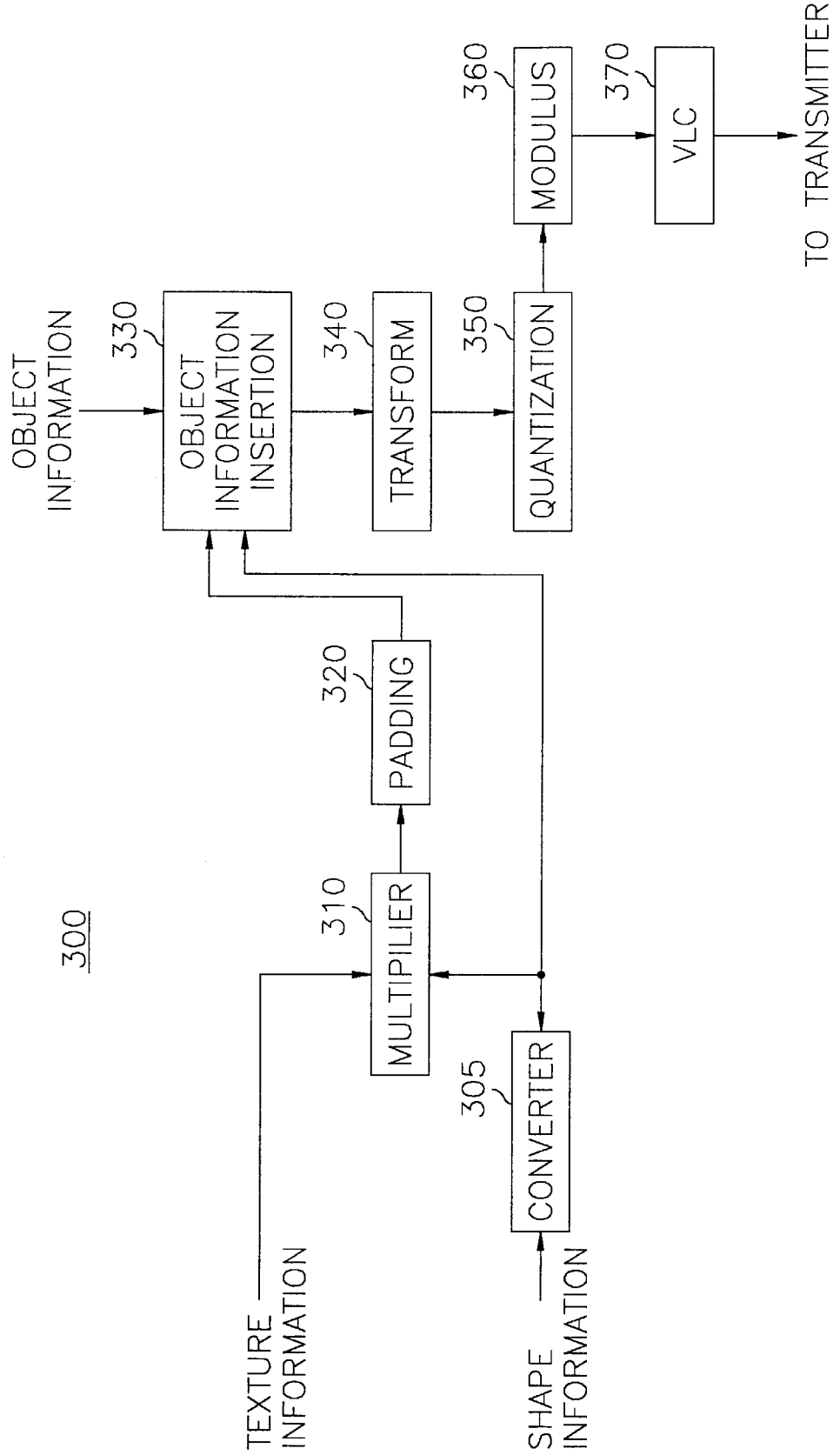
FIG. 3 provides a schematic block diagram of an inventive apparatus for encoding object information in accordance with a preferred embodiment of the present invention.
Figure 4:
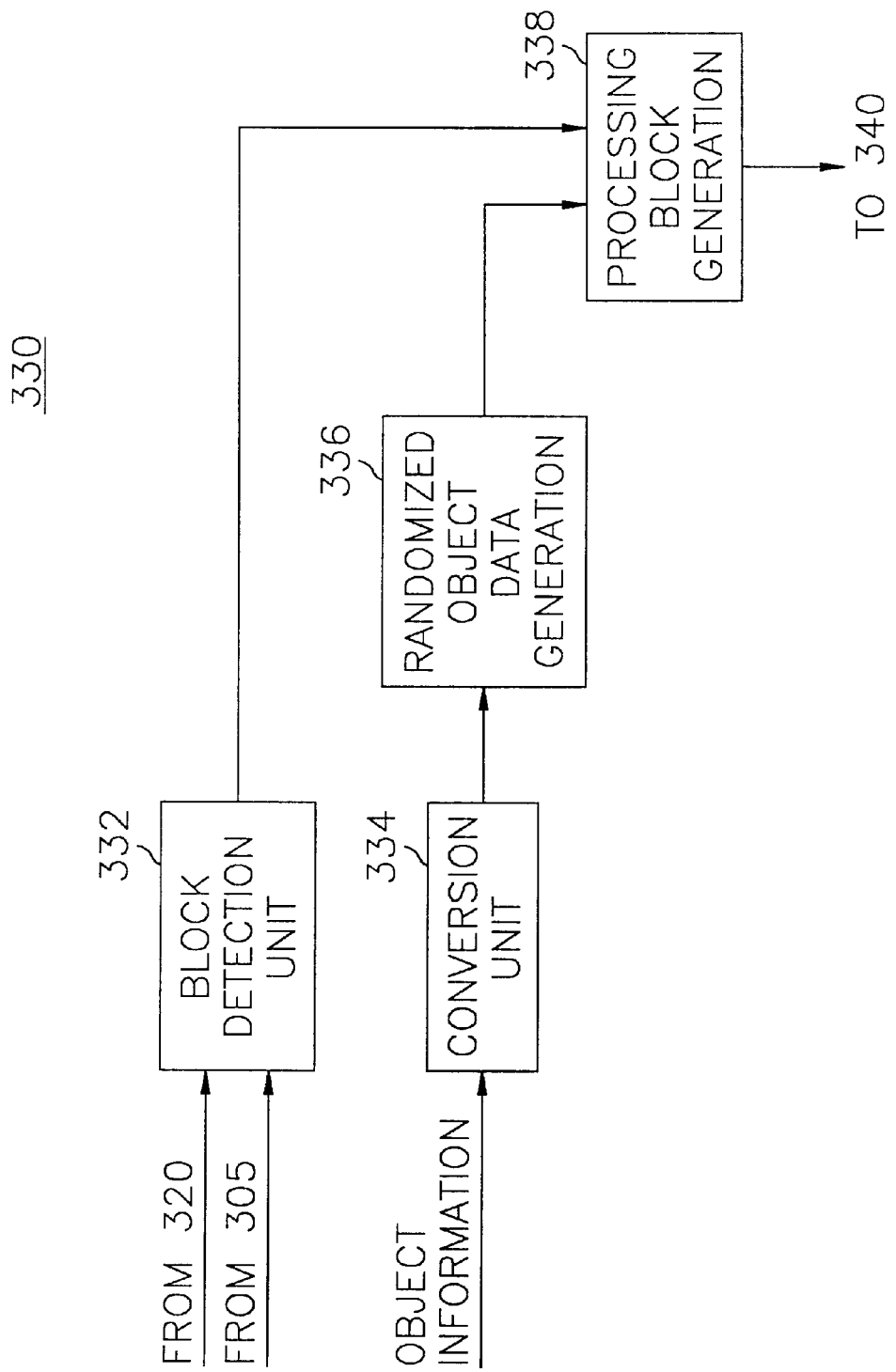
FIG. 4 illustrates a detailed block diagram of the object information insertion block in FIG. 3.

Referring to FIG. 3, there is shown a schematic block diagram of an inventive apparatus 300 for object information in accordance with a preferred embodiment of the present invention. The functions and features of a converter 305, a multiplier 310 and a padding block 320 are identical to those of their counterpart elements 105, 110 and 120 shown in FIG. 1 and, therefore, are not described again for the sake of simplicity. The padded texture information from the padding block 320 and the converted shape information from the converter 305 are applied to an object information insertion block 330 which also receives object information. A detailed process of encoding the object information at the object information insertion block 330 will be described with reference to FIGS. 2 and 4, wherein FIG. 4 illustrates a detailed block diagram of the object information insertion block 330.

Figure 1:
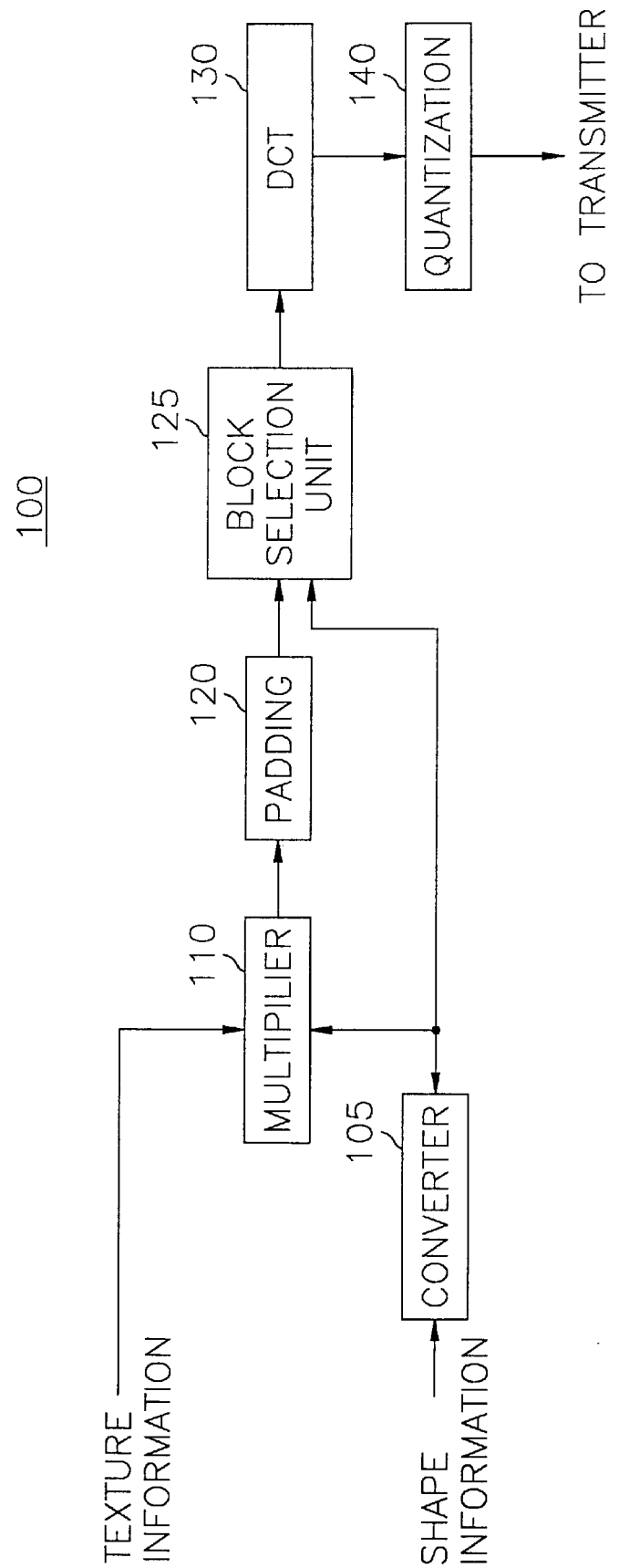
FIG. 1 represents a schematic block diagram of a conventional encoding apparatus for encoding information of a VOP.

In a similar manner as in the padding block 120 shown in FIG. 1, a block detection unit 332 detects the DCT blocks overlapping with the object 15. Among the DCT blocks in the VOP 10, the DCT block 1, which is not overlapping with the object 15 and is composed of background pixels only, is set as a background DCT block, the DCT block 7 is an object DCT block including therein object pixels only, and the remaining DCT blocks 2–6 and 8–12 are boundary DCT blocks including therein both of object and background pixels together. Upon detecting the object and background DCT blocks, the block detection unit 332, appends an identification flag to each background pixel, the identification flag representing that a flag-appended pixel belongs to the background 20; and provides the object and the boundary DCT blocks as processing DCT blocks to a processing block generation unit 338.

In the meantime, the object information is inputted to a conversion unit 334. At the conversion unit 334, each of characters, numbers, symbols and the like representing the object information is converted to a binary symbol represented by binary numbers of, e.g., 8 bits. A set of binary symbols generated by the conversion unit 334 is applied to a randomized object data generation unit 336. The set of binary symbols may produce a certain pattern, which can be quite different from that of the object pixels, and, therefore, a coding efficiency of the subsequent transform process, e.g., DCT, may be degraded. For this reason, the randomized object data generation unit 336 produces a set of randomized object symbols by multiplying each binary symbol by a random number.

The random number is selected in a predetermined manner among a predetermined set of random numbers. The random number should be substantially large enough to make the object information undamaged during a later quantization process. The set of randomized object symbols from the randomized object data generation unit 336 is fed to the processing block generation unit 338. The processing block generation unit 338 detects background pixels included in the processing DCT block based on the identification flags appended thereto.

Conventionally, the blocks are processed in a raster scanning order from left-to-right and up-to-bottom. Therefore, the processing DCT blocks shown in FIG. 2 are processed in the order of the DCT block 2 to the block 12. The processing block generation unit 338 finds the first processing DCT block, i.e., the block 2, and adds one-by-one the randomized object symbols to padded background pixels selected in the raster scanning order within the DCT block 2. If there remain randomized object symbols not yet added, those randomized object symbols are added to background pixels in subsequent boundary DCT blocks in the same manner described above until all the object symbols are processed. Upon processing the randomized object symbols, one or more processed boundary DCT blocks include the randomized object symbols information whereas the remaining unprocessed boundary DCT blocks and every object DCT block remain intact. All of these blocks are provided to a transform block 340 as processing blocks.

Referring back to FIG. 3, the transform block 340 converts each processing block into a set of transform coefficients by using, e.g., a conventional discrete cosine transform(DCT) technique and provides the set of transform coefficients to a quantization block 350, wherein the set of transform coefficients is quantized to generate a set of quantized transform coefficients which is provided to a modulus block 360.

At the modulus block 360, a modulus process is carried out for pixels exceeding a predetermined maximum value based on a conventional modulus technique. The range of a value of a quantized transform coefficient is limited within a predetermined maximum value by subtracting integer times the maximum value, i.e., a modulus from the quantized transform coefficient, wherein the modulus is, e.g., 255. For instance, if the maximum value, which can be processed in a subsequent statistical coding process, e.g., based on a VLC(variable length coding) technique, is 255 and a quantized transform coefficient corresponding to a background pixel including therein a randomized object symbol has a value of 520, the value of the quantized transform coefficient is reduced to 10(=520−255×2) and modulus information is appended thereto, wherein the modulus information represents the number of modulus process. In this case the modulus information has a value of 2. On the other hand, if a quantized transform coefficient corresponding to a background pixel including therein a randomized object symbol has a value of 270, the value of the quantized transform coefficient is reduced to 15(=270−255×1) and modulus information has a value of 1. The modulus processed data is provided to a VLC block 370. At the VLC block 370, the modulus processed data is VLC coded and transmitted to a transmitter(not shown) for the transmission thereof.

At a decoder of a receiving end, the transmitted VLC coded data is reconstructed into processing blocks by a sequence of a variable length decoding, an inverse modulus, an inverse quantization and an inverse transform process. Thereafter, the texture information of the object is obtained based on the reconstructed processing blocks and the shape information of the object transmitted from the transmitter. Then, an inverse padding process is performed based on the boundary pixels of the reconstructed texture information of the object and the padded pixel values of the background pixels are removed. The remaining values for the boundary pixels at this moment are divided by the predetermined set of random numbers prestored at the decoder to thereby produce binary symbols corresponding to the object information. The binary symbols are then translated into the object information.

While the present invention has been described with respect to certain preferred embodiments only, other modifications and variations may be made without departing from the spirit and scope of the present invention as set forth in the following claims.

What is claimed is:

1. A method for encoding a video signal including a video object plane(VOP) and object information thereof, the VOP having an object therein, comprising the steps of:
   (a) dividing the VOP into a plurality of blocks and detecting boundary blocks and object blocks, wherein each boundary block includes therein background pixels and object pixels and each object block includes therein object pixels only, the background and the object pixels representing pixels residing outside and inside the object, respectively;
   (b) converting the object information into a set of object symbols;
   (c) adding each object symbol to a background pixel included in a boundary block to thereby produce processing blocks, the processing blocks including the object blocks and one or more processed boundary blocks having therein the object symbols and the remaining unprocessed boundary blocks not having therein the object symbols; and
   (d) encoding the processing blocks to thereby generate an encoded video signal.

2. The method according to claim 1, wherein each object symbol is represented by binary numbers.

3. The method according to claim 2, wherein the converting step (b) includes the steps of:
   (b1) converting the object information into a set of binary symbols, wherein each binary symbol is represented by binary numbers of P bits, P being a positive integer; and
   (b2) multiplying each binary symbol by a random number selected among a predetermined set of random numbers to thereby provide the set of object symbols.

4. The method according to claim 3, wherein the background pixels have values obtained by a padding technique based on the object pixels.

5. The method according to claim 4, wherein the padding technique is a repetitive padding technique.

6. The method according to claim 5, wherein the encoding step (d) includes the steps of:
   (d1) transforming each processing block to provide a set of transformation coefficients;
   (d2) quantizing the set of transform coefficients to produce a set of quantized coefficients; and
   (d3) coding the set of quantized coefficients based on a statistical coding technique to produce the encoded video signal.

7. The method according to claim 6, wherein the encoding step (d) further includes, after the quantizing step (d2), the step of (d21) limiting the values of the quantized coefficients based on a modulus technique.

8. The method according to claim 7, wherein the adding step (c) includes the steps of:
   (c1) detecting one or more boundary blocks to incorporate therein the object symbols; and
   (c2) adding each object symbol to a background pixel included in the detected boundary blocks thereby generating the processed boundary blocks.

9. The method according to claim 8, wherein the dividing step (a) includes the steps of (a1) generating identification flags to background pixels included in the boundary blocks, an identification flag appended to a pixel indicates that the pixel corresponds to a background pixel.

10. The method according to claim 9, wherein the one or more boundary blocks are detected by using the identification flags.

11. An apparatus for encoding a video signal including a video image which has an object therein and object information, wherein the video image is composed of object pixels and background pixels, the object pixels residing inside the object and the background pixels residing outside the object, comprising:
    means for dividing the video image into a plurality of blocks and classifying each block as one of a background block, a boundary block and an object block, wherein the background block includes therein background pixels only, the boundary block includes therein object and background pixels and the object block includes therein object pixels only;
    means for generating a set of object symbols of binary numbers representing the object information;
    means for producing processing blocks by incorporating the object symbols into the object blocks and the boundary blocks; and
    means for encoding the processing blocks thereby generating an encoded video signal.

12. The apparatus according to claim 11, wherein the generating means includes:
    means for converting the object information into a set of binary symbols, each binary symbol being represented by a predetermined number of binary numbers; and
    means for obtaining the set of object symbols by multiplying each binary symbol by a random number selected in a preset manner among a predetermined set of random numbers.

13. The apparatus according to claim 12, wherein the processing blocks includes the object blocks and one or more processed boundary blocks having therein the object symbols and the object blocks and the remaining boundary blocks having none of the object symbols.

14. The apparatus according to claim 13, wherein the means for producing the processing blocks includes:
    means for finding one or more boundary blocks to incorporate therein the object symbols; and
    means for adding each object symbol to a background pixel included in the boundary blocks found to thereby produce the processed boundary blocks.

15. The apparatus according to claim 14, wherein the video image dividing means includes means for appending identification flags to background pixels included in the boundary blocks, wherein an identification flag appended to a pixel indicates that the pixel is a background pixel.

16. The apparatus according to claim 15, wherein the one or more boundary blocks and the background pixel to which each object symbol is added are detected based on the identification flags.

17. The apparatus according to claim 16, wherein the one or more boundary blocks are found according to a raster scanning order.

18. The apparatus according to claim 17, wherein the encoding means includes:

means for transforming each processing blocks to provide a set of transform coefficients;

means for quantizing the set of transform coefficients to generate a set of quantized coefficients; and means for coding the set of quantized coefficients to generate the encoded video signal.

19. The apparatus according to claim 18, wherein the coding means includes:

means for limiting a value of each quantized coefficient in the set to thereby produce a set of limited quantized coefficients; and means for statistically coding the set of limited quantized coefficients to generate the encoded video signal.

20. The apparatus according to claim 19, wherein the limiting the value of each quantized coefficient is carried out based on a modulus technique.

* * * * *